June 25, 1940.  G. A. KENDALL  2,205,656
TRAILER CONNECTION
Filed Aug. 11, 1938  2 Sheets-Sheet 1
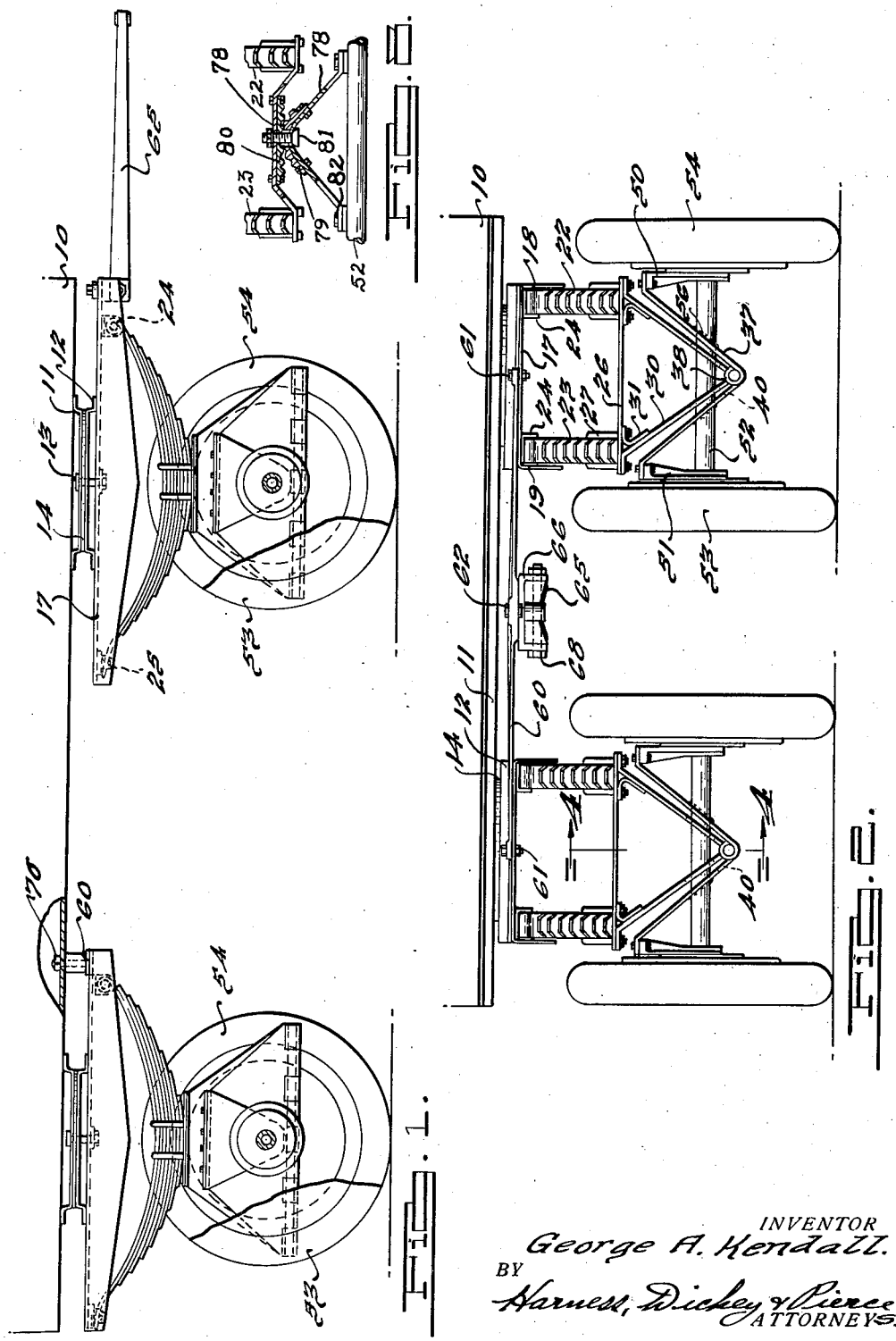
INVENTOR
George A. Kendall.
BY Harness, Dickey & Pierce
ATTORNEYS.

June 25, 1940.   G. A. KENDALL   2,205,656.
TRAILER CONNECTION
Filed Aug. 11, 1938   2 Sheets-Sheet 2
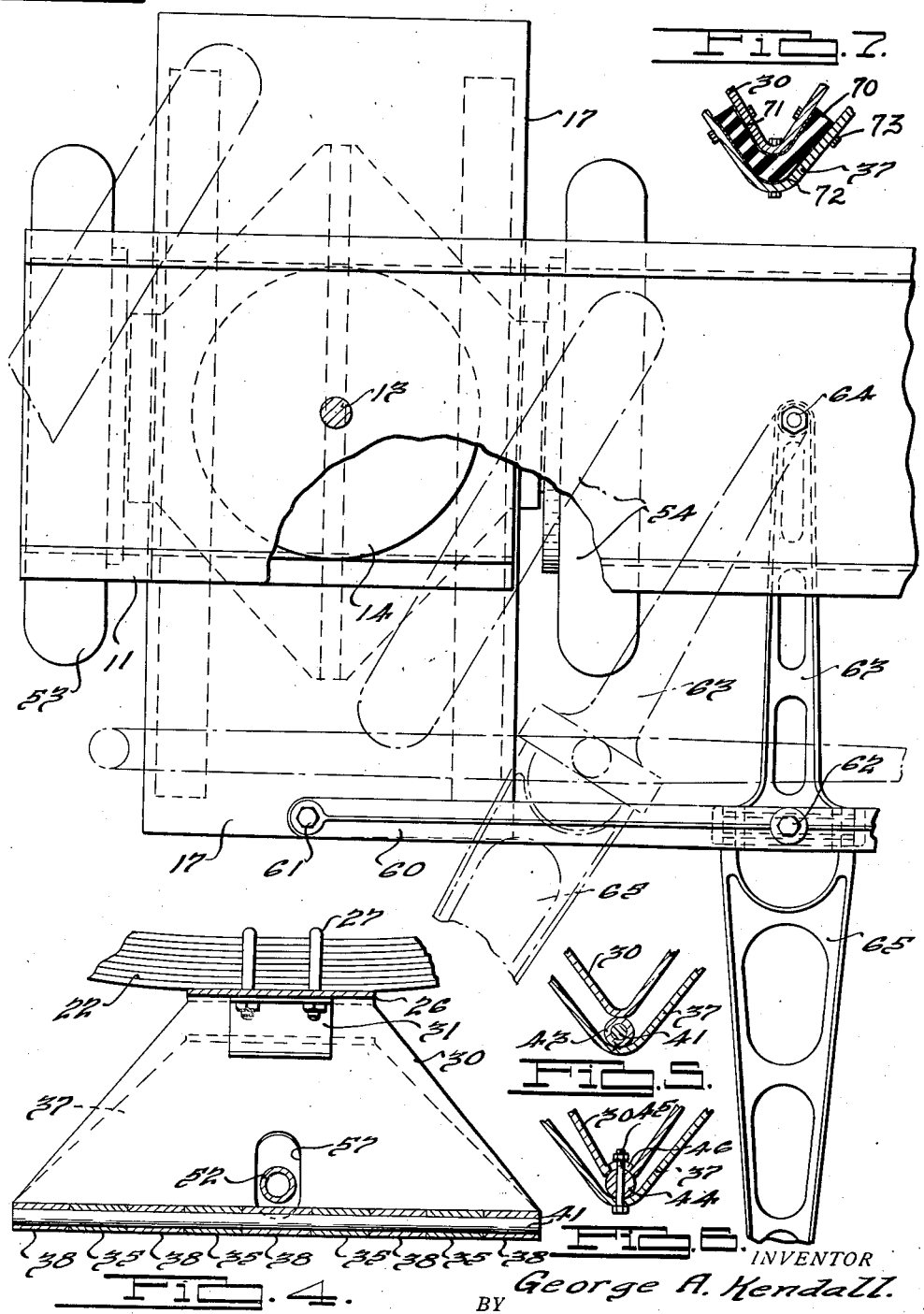
INVENTOR
George A. Kendall.
BY Harness, Dickey & Pierce
ATTORNEYS.

Patented June 25, 1940

2,205,656

UNITED STATES PATENT OFFICE 2,205,656

TRAILER CONNECTION

George A. Kendall, Detroit, Mich.

Application August 11, 1938, Serial No. 224,353

17 Claims. (Cl. 280—81)

The invention relates generally to trailers and it has particular relation to wheel mountings and arrangements therefor.

One object of the invention is to provide an improved trailer equipped with freely rotatable dual wheels, wherein the wheels are mounted for tilting movement in a lateral direction by an arrangement which is simple, relatively inexpensive, and durable.

Another object of the invention is to provide an improved dual wheel arrangement for trailers of the general character stated above, wherein each set of wheels is turnable or steerable.

Another object of the invention is to provide a dual wheel mounting in connection with trailers, wherein the mounting is designed to strongly resist longitudinal as well as lateral forces, to the end that it will function efficiently for a long period of time.

Other objects of the invention will become apparent from the following specification, from the drawings relating thereto, and from the claims hereinafter set forth.

For a better understanding of the invention, reference may be had to the drawings wherein:

Figure 1 is a longitudinal and sectional view, illustrating a trailer constructed according to one form of the invention;

Fig. 2 is a front elevational view of the construction shown by Fig. 1;

Fig. 3 is a fragmentary, top plan view, illustrating the manner in which the wheels may be turned or steered;

Fig. 4 is a cross-sectional view, taken substantially along the line 4—4 of Fig. 2;

Figs. 5 and 6 are cross-sectional views illustrating modified forms of hinging means for the V-shape mounting plates;

Fig. 7 is a similar view illustrating a rubber connection between the mounting plates; and Fig. 8 is a similar view illustrating a gear type pivot connection between the plates.

Referring to Figures 1 and 2, the frame of the trailer is indicated generally at 10 and it will be understood that this is constructed of steel and that the particular design thereof may be varied. In the illustrated embodiment of the invention, the trailer is supported on four sets of dual wheels, which are identical in construction with the exception that the front sets are connected to a steering arrangement, although, as will become apparent hereinafter, either of the front or rear sets of wheels may be connected with a steering arrangement. More specifically, the steering arrangement may be disposed at either end, although normally the wheels at one end only of the trailer will be connected to the steering mechanism. Since each set of dual wheels is mounted in substantially the same way and is of the same design, only one set will be described in detail.

Still referring to Figures 1 and 2, it will be noted that for each set of wheels, a plate 11 is secured to the under side of the frame 10 and that this plate is turnably connected to a similar plate 12 by means of a bolt 13. An additional plate 14 may be disposed between the plates 11 and 12 for the purpose of providing a bearing element between the plates.

At its under side, the plate 12 is rigidly connected to a plate 17, which, as best shown by Fig. 2, is of channel shape and which has side flanges 18 and 19. It is to be understood that the plate 17 may be welded to the plate 12, and that the plate 11 may be similarly connected to the trailer frame 10. Leaf springs 22 and 23 are connected to the plate 17 by means of pivot brackets 24 at one end of the springs and shackle bolts 25 at the other ends of the springs. Different ways may be employed in connecting such ends of the springs to the plate 17 provided one end of each spring is so connected to the plate that such end of the spring can move longitudinally when the spring flexes.

At its center, each spring is connected to a plate 26 by means of U bolts 27. This plate, at its under side, is connected to a V-shape plate member 30 and in the arrangement illustrated, the bolts 27 also secure the legs of the V-shape member 30 to the plate 26. Reinforcing brackets 31 may also be secured to the spring connecting bolts 27 and these brackets are welded to the legs of the V-shape plate 30.

At its lower end, or apex, the V-shape plate member 30 has, as shown by Fig. 4, eyes or bead elements 35, and each of these may be formed by bending the apex portion of the member and cutting out the metal between the bead segments. The plate member 30 nests in a similarly shaped V-member 37, although the angularity of the second V-shape member is somewhat greater than the first, so as to permit limited lateral movement of one with respect to the other about an axis located at the apex of the members. The apex portion of the second member 37 is provided with eyes or beads adapted to fit in between the eyes or beads 35 on the member 30, and such eyes or beads 37 may be formed, as shown by Fig. 2, by striking out tongues to the point indicated at 40, and then bending them into bead form as indicated. A pin or pintle 41 extends through the assembled beads so as to hingedly connect the two plate members at their apices.

Instead of using this type of hinge, tube segments 43, as shown by Fig. 5, may be disposed between the apex portions of the plates and alternating segments welded respectively to such plates. These segments receive the pintle 41, as will be understood.

Again, as shown by Fig. 6, the apex portions of the members may be rounded and a pintle 44 disposed between them. In this arrangement, vertical movement of the members relatively may be prevented by means of any suitable device, such as by bolts 45 passing vertically through the pintle and the apex portions of both members while a laterally extending slot 46 in the apex portion of one member permits lateral turning of the other member, pintle, and bolt as a unit.

The legs of the member 37 extend upwardly and are fastened to brake shoe anchor plates 50 and 51 that in turn are mounted on opposite ends of an axle 52 which rotatably carries wheels 53 and 54. The axle 52 extends through openings in the legs of the member 37 and is welded thereto, as indicated at 56. As shown by Fig. 4, the legs of the upper member 30, however, are provided with enlarged openings 57 for receiving the axle 52 and these enlarged openings permit tilting movement of the axle and member 37, with respect to the member 30.

As shown by Figures 2 and 3, the forward ends of the two plates 17 are interconnected by means of a cross bar 60 that is pivotally connected to both legs by pivot bolts 61. This bar, at its center, is pivotally connected, as indicated at 62, to a rearwardly extending bar 63, in turn pivotally connected, as indicated at 64, to the frame of the vehicle. The two plates 17, connecting bar 60, and bar 63, are arranged in parallelogram fashion, so that movement of the bar 60 in a transverse direction, causes steering of the two front sets of wheels. For the purpose of steering these wheels, a tongue 65 is connected to the bar 60 through a swivel bracket 66 that is connected to the bar by the bolt 62. A bolt 68 directly connects the tongue 65 to the swivel bracket and it will be appreciated that the tongue may be swung in a vertical direction about the axis of the bolt 68 and that the bracket and tongue may be swung as a unit about the vertical axis of the bolt 62.

Fig. 7 shows a means for hingedly connecting the plates by using rubber indicated at 70. This rubber is vulcanized to a pair of V-shape plates 71 and 72 fitting the V portions of the plates 30 and 37 and the former are releasably secured to the latter by screws 73. Each of the screws extends through an opening in the plate 30 or the plate 37, as the case may be, and is threaded into an opening in the adjacent plate 71 or 72, it being understood that each of the plate 71 and 72 are thus separately secured to the plates 30 and 37. It is to be realized that the rubber could be bonded directly to the plates 30 and 37 but use of the plates 71 and 72 is desirable so as to permit ready assembly and separation of the former when required. The rubber manifestly permits the required relative movement of plates 30 and 37 and particularly the hinging movement thereof. Moreover, the rubber serves as a cushion and if desired the springs 22 and 23 might be eliminated in this event. It will be apparent that if the springs are omitted, the plate 26 may be raised for connection with the member 17 or suitable connecting members may be disposed between plate 26 and member 17.

In the structure shown by Fig. 8 plates 77 and 78 are provided which are reversely related as compared to the other structures and these plates respectively have gear or tooth segments 79 and 80 which are in engagement. A bolt 81 serves to prevent vertical separation of the plates and it will be observed that this bolt is disposed in an enlarged opening in the lower plate. It will be apparent that the lower plate will so to speak "walk" on the upper plate when the former swings laterally so as to shift the load point when the position of the wheels is shifted laterally with respect to the frame.

It will be noted that the legs of the lower plate are bolted to bosses on the axle as indicated at 82 and that the legs of the upper plate act as spring supports. While the bolt 81 will be loose enough to permit the pivotal movement required, it may be stated that a block of rubber might be employed between the head of the bolt and the plate 78 if desired.

As illustrated by Fig. 1, the rear sets of wheels are identical to the front sets excepting that they are locked against turning or steering by a bolt device 70 secured to the frame. It is evident that the two rear sets may be connected by a cross bar 60 such as used in connection with the front wheels and that the bolt 76 may connect the central part of the bar to the frame. If desired, this cross bar 60 may be at the rear side of the rear set of wheels so that the tongue 65 may be changed from front to rear and thus the rear end of the trailer may be pulled and thus used as the front end of the trailer. In other words, either end of the trailer may have steerable wheels and be connected to the truck, it being understood that the rear set of wheels in either case will be locked to the trailer frame.

The construction illustrated and described is not complicated and, therefore, may be manufactured in an inexpensive manner. Although of simple and inexpensive design, it will be realized that the wheels are mounted in a positive and durable manner while still permitting the tilting and pivotal movement required. Tilting of any wheel is positively limited by the play between the two V-shaped plates and if desired cushioning means may be provided to cushion such tilting movement and to avoid noise. While the axle has been described as being welded to the lower V-shaped plate 37, it is apparent that such welding may be omitted, providing that the members 50 are fixed to the outer ends of the axle.

Although more than one form of the invention has been described and illustrated in detail, it will be apparent to those skilled in the art that various modifications may be made without departing from the scope of the appended claims.

What is claimed is:

1. In combination, a vehicle frame, a generally V-shaped frame member connected to and depending from the frame with the apex portion lowermost, a pair of wheels, a similar V-shape member connecting the wheels and receiving the first member, and means pivotally connecting the apex portions of the two members, said members having different angularities so that limited relative pivotal movement is permitted.

2. In combination, a vehicle frame, a generally V-shape member connected to the frame and depending therefrom with the apex portion lowermost, a pair of wheels, an axle connecting the wheels, a V-shape member connected to the axle and wheels and receiving the first member in a generally nested relation, and means hingedly connecting the apex portions of the members, the angularities of said members being such that limited relative pivotal movement thereof is permitted.

3. In combination, a vehicle frame, a generally V-shape plate member connected to the frame and depending therefrom with the apex portion lowermost, a pair of wheels, an axle connecting the wheels, a V-shape plate member receiving the first plate member in nesting relation but having a greater angularity than the first member, means hingedly connecting the apex portions of said members, both of said members having openings through which the axle passes and the openings in the first plate member being larger than the axle so as to permit pivotal movement of the axle about the hinge means, and means operatively connecting the axle to the second plate member.

4. In combination, a vehicle frame, a vehicle wheel, a pair of nested V-shape plate members, the outer of which has a greater angularity than the inner so as to permit limited and relative pivotal movement thereof about an axis extending along the apex portions of such members, means hingedly connecting such apex portions, means connecting one plate member to the frame, and means connecting the other plate member to the wheel.

5. In combination, a vehicle frame, a vehicle wheel, a pair of nested V-shape plate members, the outer of which has a greater angularity than the inner so as to permit limited and relative pivotal movement thereof about an axis extending along the apex portions of such members, means hingedly connecting such apex portions, means connecting one plate member to the frame, and means connecting the other plate member to the wheel and comprising an axle fastened to said other plate member and extending loosely through an opening in the plate member connected to the frame.

6. In combination, a vehicle frame, a vehicle wheel, a pair of nested V-shape plate members, the outer of which has a greater angularity than the inner so as to permit limited and relative pivotal movement thereof about an axis extending along the apex portions of such members, means hingedly connecting such apex portions, means connecting one plate member to the frame, means connecting the other plate member to the wheel, the hinge connecting means comprising alternating curved beads on the plate members respectively, and a pintle extending through such beads.

7. In combination, a vehicle frame, a pair of wheels, an axle connecting the wheels, a V-shape plate member having a transverse opening receiving the axle, means hingedly connecting the plate member to the frame for hinging movement about an axis extending longitudinally of the apex of the member, a brake shoe anchor plate for each wheel, and means connecting the leg portions of the plate member respectively to the brake shoe anchor plates.

8. In combination, a vehicle frame, a horizontal plate pivoted to the frame for movement about a vertical axis, a second plate below the first plate, spring means between the plates and connected thereto, a V-shape plate member below the second plate and having its legs connected thereto, a wheel, and means pivotally connecting the wheel to the V-shape member for movement about a horizontal axis extending longitudinally of the frame.

9. In combination, a vehicle frame, a horizontal plate below the frame, spring means between the frame and plate and connected thereto, a V-shape plate member below the first plate and having its legs connected to the latter, a wheel, and means pivotally connecting the wheel to the V-shape plate for movement about a horizontal axis extending longitudinally of the frame.

10. In combination, a vehicle frame, a horizontal plate below the frame, spring means between the frame and plate and connected thereto, a V-shape plate member below the first plate and having its legs connected to the latter, a wheel, and means pivotally connecting the wheel to the V-shape plate for movement about a horizontal axis extending longitudinally of the frame and which is located at the apex of said V-shape plate.

11. In combination, a vehicle frame, a plate on the under side of the frame mounted for pivotal movement about a vertical axis, a second plate disposed below the first plate, spring means between and connecting the plates, a pair of wheels below the second plate, and means connecting the second plate to the wheels including means permitting tilting movement of both wheels about a common axis extending longitudinally of the frame.

12. In combination, a vehicle frame, a plate on the under side of the frame mounted for pivotal movement about a vertical axis, a second plate disposed below the first plate, spring means between and connecting the plates, a pair of wheels below the second plate, and means connecting the second plate to the wheels including means permitting tilting movement of both wheels about a common axis extending longitudinally of the frame, the last mentioned means including nested V-shape plates that are hingedly connected at their apices.

13. In combination with a vehicle frame, a plate member secured to the frame, a wheel, a second plate member connected to the wheel, one of said plate members having a portion curled to provide a pintle receiving bead and the other of said plate members having spaced beads similar to and disposed at opposite ends respectively of the bead on the first plate member, and a pintle extending through all of the beads to hingedly connect the plate members.

14. In combination, a vehicle wheel frame, a wheel, a pair of nested V-shape plates, the outer of which has greater angularity than the inner so as to permit limited and relative pivotal movement thereof about an axis extending along the apex portions of the plates, rubber between the apex portions of the plates and movably connecting them, means connecting one plate to the wheel, and means connecting the other to the frame.

15. In combination, a vehicle frame, a wheel, a pair of V-shape plates having their open sides directed downwardly, means connecting the upper plate to the frame, means including an axle connecting the lower plate to the wheel, and means movably mounting the apex portion of one plate on the apex portion of the other.

16. In combination, a vehicle frame, a wheel, a pair of V-shape plates having their open sides directed downwardly, means connecting the upper plate to the frame, means including an axle connecting the lower plate to the wheel, and means movably mounting the apex portion of one plate on the apex portion of the other, said means comprising interengaging tooth segments on the plates.

17. In combination, a vehicle wheel frame, a pair of wheels, a pair of longitudinally elongated substantially V-shape plates nested one within the other and hingedly connected at their apices, means operatively connecting one plate to the wheels and means operatively connecting the other plate to the frame, the legs of one plate being respectively separated from the legs of the other so as to allow relative but limited pivotal movement of the plates and hence limited pivotal movement of the wheels with respect to the frame.

GEORGE A. KENDALL.